United States Patent [19]
Crivelli

[11] Patent Number: 5,468,539
[45] Date of Patent: Nov. 21, 1995

[54] PRECAST SURFACE PAVING OVERLAY COMPRISING RUBBER CRUMBS AND CLAY PARTICLES

[76] Inventor: Henry Crivelli, 1505 N. Riverside Dr., Pompano Beach, Fla. 33062

[21] Appl. No.: 202,450

[22] Filed: Feb. 28, 1994

Related U.S. Application Data

[60] Continuation-in-part of Ser. No. 110,125, Aug. 20, 1993, abandoned, which is a division of Ser. No. 631,893, Dec. 21, 1990, Pat. No. 5,258,222.

[51] Int. Cl.⁶ ........................................... B32B 5/16
[52] U.S. Cl. ............................. 428/141; 404/32; 404/70; 428/143; 428/324; 428/325; 428/327; 428/331; 428/413; 428/492; 428/903.3; 524/445
[58] Field of Search ..................................... 428/141, 143, 428/323, 324, 325, 327, 331, 413, 492, 903.3; 404/32, 70; 52/403.1, DIG. 9; 525/240; 524/445

[56] References Cited

U.S. PATENT DOCUMENTS

| | | | |
|---|---|---|---|
| 3,272,098 | 9/1966 | Buchholtz et al. | 404/32 |
| 5,258,222 | 11/1993 | Crivelli | 428/323 |

*Primary Examiner*—D. S. Nakarani
*Assistant Examiner*—H. Thi Lê
*Attorney, Agent, or Firm*—Morse, Altman, Dacey & Benson

[57] ABSTRACT

A rubber tire recycling process comprises the steps of granulating black rubber tire side walls and treads and granulating white rubber tire side walls to form coarse rubber crumbs, mixing the coarse rubber crumbs with fine clay particles to form a closely packed mixture, thoroughly wetting the surfaces of the coarse particles with a uncured EPDM rubber to provide a fluid, casting the fluid into a sheet-like configuration, and curing the sheet-like configuration under sufficient heat and for a sufficient time to provide an environmentally compatible paver for outdoor or indoor surfaces.

1 Claim, 3 Drawing Sheets

PRECAST SURFACE PAVING OVERLAY COMPRISING RUBBER CRUMBS AND CLAY PARTICLES

RELATED APPLICATIONS

The present application is a continuation-in-part of application Ser. No. 08/110,125, filed Aug. 20, 1993, and since abandoned, in the name of Henry A. Crivelli, the inventor herein, entitled "Incorporation of Rubber Tire Crumbs and Siliceous Crystalline Grains in Construction Products", which in turn is a division of Ser. No. 07/631,893, filed Dec. 21, 1990, now U.S. Pat. No. 5,258,222, issued Nov. 2, 1993, having the same title and same inventor as the aforementioned applications and patent.

BACKGROUND OF THE INVENTION

1. Field of the Invention

The present invention relates to products having compositions incorporating rubber crumbs derived primarily by recycling rubber tires and, more particularly, to the manufacture of precast underfoot surfacing, containing recycled tire rubber and other rubber scrap for walkways, driveways and the like.

2. The Prior Art

An ongoing critical need exists for an environmentally compatible paving and outdoor flooring overlay that is resistant to wear, weather and chemicals. The present invention contemplates the use, as a substantial ingredient in such overlays, of vulcanized rubber crumbs derived from the ever increasing supply of scrap rubber tires. The present invention is environmentally compatible in the sense that it utilizes a growing accumulation of scrap that is very difficult to discard, in a product that is very resistant to deterioration.

The problem of scrap tires and their disposal has occupied the public's attention of many for years. Some have suggested using whole scrap tires for erecting structures. See Martin Pawley, *Building for Tomorrow: Putting Waste to Work*, Sierra Club Books, San Francisco, 1982. Others have developed machines designed to cut the tread portion from the tire for use as a roof covering. Ibid. Still others have turned to incineration for the direct production of energy, or to tire rubber chips as a fuel supplement in paper mills, cement kilns and other industrial heat generators. For one reason or another, few of these recycling efforts have been adequately successful, commercially or environmentally.

Recycled rubber, as defined by the Rubber Recycling Division of the National Association of Recycling Industries, Inc., generally refers to any sort of rubber waste, including scrap tires, that has been converted into an economically useful form, such as ground rubber, reprocessed rubber, and die-cut punched rubber parts. In contrast to recycled rubber, reclaimed rubber represents a product resulting from a process in which waste vulcanized scrap rubber is treated to produce a plastic-like, devulcanized material that can be processed, compounded and re-vulcanized with or without the addition of either natural or synthetic binders. The vulcanization process technically, by definition, is irreversible under normal conditions. Nevertheless, an accepted definition for "devulcanization" is a change in vulcanized condition which results in decreased resistance to deformation at ordinary temperatures.

Most techniques for reclaiming scrap rubber involve continuous batch processing. In one conventional continuous technique, scrap tire rubber is ground, and any foreign components such as metal and/or fiber are mechanically separated from the ground rubber remainder, which then is further ground to finer particle size. Next, the finely ground rubber, together with various reclaiming agents, are metered into a blending system and conveyed to a special screw-extrusion machine. In this machine, the finely ground rubber is softened by a controlled and variable amount of high heat and pressure in a continuously moving environment. The softened rubber matrix next is continuously discharged through an extrusion head, whereupon it is cooled and conveyed to the millroom for the final stage of the reclaiming process. For screw extruders, see D. H. Morton-Jones, *Polymer Processing*, Chapman & Hall, 1989. In the millroom, the softened and now cooled rubber is generally mixed with ingredients in a suitable blender, then reheated and replasticized, i.e. devulcanized, in a barrel-mixer. Thence it is fed first to a high-friction breaker mill and next to a high-friction refiner mill. A high-friction ratio for the refiner mill is achieved with different-size rolls rotated at considerably different speeds. The rolls are set tightly to produce a thin sheet of reclaimed rubber that is smooth, uniform and free of grains and lumps. The finished thin sheet of reclaimed rubber emanating from the refiner mill is pulled to a wind-up drum, and allowed to build up to a thickness of about an inch before being cut therefrom by a knife. The resulting reclaimed rubber is in the form of an intermediate slab, which is dusted to reduce tackiness, and stacked. Since reclaimed rubber is cheaper than natural or synthetic rubber, it is widely used in the manufacture of new rubber goods, including new tires.

SUMMARY OF THE INVENTION

The present invention relates to a novel process of recycling, not reclaiming, scrap tire rubber, and to various recycled rubber products so made, not including tires.

A principal object of the present invention is to provide a recycling process for incorporating vulcanized white and black rubber crumbs, obtained from (1) the white side walls of tires and other vulcanized white rubber scrap, and (2) from the black side walls and treads of discarded tires and from other vulcanized black rubber scrap, into rubber-clay matrices, and to outdoor overlays composed thereof.

Generally, the process of the present invention comprises the steps of granulating vulcanized white rubber and black rubber scrap, typically derived from (1) the white side walls and (2) the black side walls and treads of rubber tires, to separately or simultaneously form coarse white and black rubber crumbs, blending the rubber crumbs to provide a predetermined formulation thereof, mixing the coarse predetermined formulation of rubber crumbs with fine clay particles to form a closely packed mixture, the coarse crumbs and fine particles generally being at least approximately an order of magnitude different in mesh size, thoroughly wetting the surfaces of the coarse rubber crumbs and fine clay particles with an ethylene-propylene rubber (EPDM) binder, molding the resulting intermediate composition into an outdoor overlay configuration, curing the overlay configuration under sufficient heat and for a sufficient time to provide a compounded laminar mass, and embossing at least one face of the laminar mass to provide an environmentally compatible overlay product, e.g. a paver or tile for driveways, walkways, etc. The process is such that the ethylene-propylene rubber binder is introduced to the rubber-clay particle system as an uncured solid or liquid which flows freely when heated. The resulting products are characterized by excellent weather, wear and chemical resistance.

The starting crumb rubber is largely derived from copolymer rubber tires, which are formulated from thermoplastic rubber incorporating block copolymers composed of hard and soft segments, and which, after vulcanization, are physically crosslinked to one another and exhibit crystalline behavior on stretching. The mixture of white and black crumb rubber has been found to liven the appearance of the final product while maintaining such properties as resilience, dimensional stability, and wear resistance. The starting clay is a naturally occurring aluminosilicate, which is one of a large group of minerals whose crystal lattice contains $SiO_4$ tetrahedra, either isolated or joined by one or more oxygen atoms. The starting external phase is composed of EPDM rubber and a vulcanizing agent, preferably, sulfur or peroxide. The starting interface between the phases is characterized by molecular wetting initially and cross-linking on curing. The final microstructure, in which the external and internal phase proportions are substantially maintained, is such that the clay filler is tightly and intricately locked into place among the rubber crumbs, mechanically as well as adhesively.

Other objects of the present invention will in part be obvious and will in part appear hereinafter.

The invention accordingly comprises the process and the resultant products of the present disclosure, its components, parts and their interrelationships, the scope of which will be indicated in the appended claims.

BRIEF DESCRIPTION OF THE DRAWINGS

For a fuller understanding of the nature and objects of the present invention, reference is to be made to the following detailed description, which is to be taken in connection with the accompanying drawings, wherein.

DETAILED DESCRIPTION OF THE PREFERRED EMBODIMENT

Figure 1:
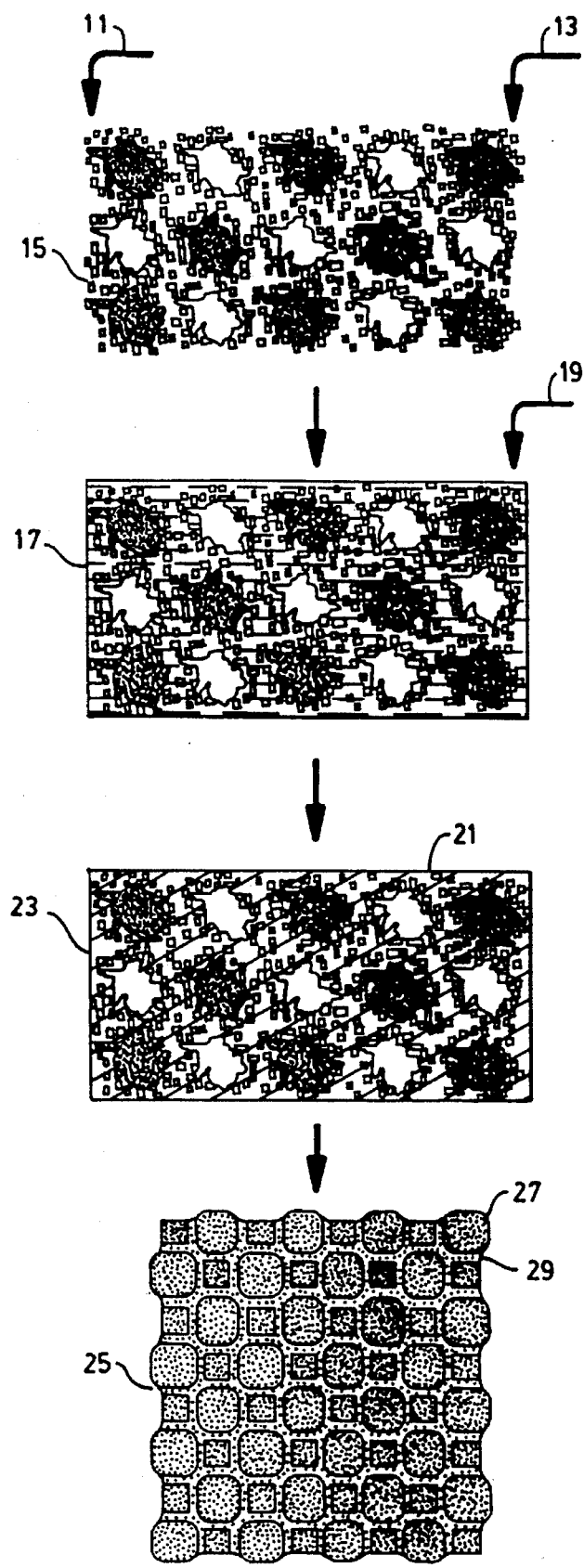
FIG. 1 is a general flow diagram of a process and a resulting end product of the present invention, outlining the steps of the process, suggesting characteristics of the particles in exaggerated cross-section, and showing the configuration of an end product.

The Process and Product as Depicted in FIG. 1

The process of the present invention is illustrated generally in the flow diagram of FIG. 1, which shows the steps of a recycling process involving coarse white and black vulcanized rubber crumbs and fine clay particles, incorporated into a polymeric matrix, by which final products are obtained.

The first step in this process is to cut (1) white tire walls and other white rubber scrap, and (2) black tire walls and treads and other black rubber scrap into flakes and to mill the flakes into coarse vulcanized rubber "crumbs", as shown at 11 in FIG. 1. It has been found that rubber crumbs produced by typical milling procedures, and as shown in FIG. 1, are characterized by fibrillar surfaces with deep asperities, i.e. fragmented surfaces which, under the microscope, look like the surfaces of frayed fabric. The fine clay particles, as shown at 13, are typical of minute inorganic crystals having planar facets that are angularly related. The coarse rubber crumbs and fine clay particles preferably are, at least approximately, an order of magnitude different in mesh size. Preferably the rubber crumbs are in the average range of 5 to 50 mesh, and the clay particles are in the average range of 200 to 400 mesh. In the dry mixture shown at 15, the dispersion and distribution of the individual rubber crumbs and the individual clay particles are excellent, i.e. the mixture is not characterized by clumps of either rubber crumbs or clay particles.

Next, the dry mixture of rubber crumbs and clay particles is thoroughly mixed as at 17 with a quantity of polymerizable fluid 19, preferably a milled or liquid dispersion of an ethylene-propylene-diene (EPDM) rubber and a vulcanizing agent such as sulfur or peroxide. The quantity of polymerizable fluid preferably is limited to slightly more than the approximate minimum, which, at its particular viscosity when liquid, is necessary to thoroughly wet the fibrillar surfaces and deep asperities of the rubber crumbs and the crystalline facets of the clay particles. The resulting viscous slurry is die molded into laminar form as at 25. The molding establishes a distribution of communicating grooves 27 and stippled lands 29.

Typically, in parts by total weight, the rubber crumbs average in the 15–40 range, the clay particles average in the 20–40 range, the EPDM rubber averages in the 15–40 range, and the sub-total of the miscellaneous optional coloring, vulcanizing agents, process oil, pigment, etc. is in the 0–20 range. Preferably, the composition consists, by weight, of approximately equal proportions of rubber crumbs and clay particles. The relative proportions of the components of the composition of the intermediate slurry and of the final product are approximately the same. Preferably the thickness of the compounded laminar intermediate dispersion, as well as the thickness of the final overlay product ranges from 3/16 to 5/8 inch.

Curing, as at 23, of the fluid mixture preferably is effected at a temperature of from 275° to 375° F. for a period of 1.0 to 25 minutes. In the final solid composite product, as shown at 23, both the vulcanized rubber crumbs and the clay particles substantially maintain the integrity of their original configurations. The EPDM external phase, however, is so completely intimate with the surfaces of the vulcanized rubber crumbs and crystalline clay particles that they are macro-mechanically, as well as chemically, bonded. The composition is such that there is some cross-linking between the external phase and the rubber crumb surfaces, and mechanical locking as well as adhesion between the external phase and the crystalline facets. The presence of the clay particles increases the abrasion resistance of the final product. The external phase, which remains uncrystallized after curing, causes the retention of considerable elastomeric resilience.

Composition of Rubber Tires Recycled Hereunder

Two of the most critical properties of rubber tires and the like include processability and vulcanization. Processability includes the conversion of elastic raw material into pliable "green stock," incorporation therein of required additives, referred to as "compounding," followed by "milling," including calendering or tubing. After processing, the stock must be cured or, as better known, "vulcanized." "Vulcanization" is a process involving the chemical bonding, i.e., the chemical crosslinking, of the rubber chains, usually with the aid of a vulcanizing agent, such as sulfur, and an accelerator under high pressure and at elevated temperature. During the process of vulcanization, the green stock changes from a plastic state to an elastic state. Consequently, with the elimination of plasticity, the vulcanized rubber's inherent resistance to deformation increases, as does its strength, resilience, and toughness. Vulcanization also eliminates thermoplasticity, i.e. the material's ability repeatedly to soften when heated and to harden when cooled. Vulcanization further introduces insolubility to the vulcanized rubber in solvents in which the green stock rubber was previously soluble.

The "rate of cure" of the green stock refers to the rate at which modulus develops after the "scorch" point. Scorch is the result of the combined effects of time and temperature, i.e. the heat history, on an already compounded stock. "Scorch time" generally defines the time to onset of vulcanization and represents the time available for processing. "Cure time" is that time which is required for the desired amount of crosslinking to occur in the stock so as to produce the desired level of properties in the final product. Cure time is a function of the "scorch time" and the "crosslink time," which latter is controlled by the rate of cure. Depending on the end use, some rubber products are more vulcanized, i.e., crosslinked, than others. Specifically, tires are more highly vulcanized than many other rubber products. And even among as well as within tires, various parts are more highly vulcanized than others.

In general, state of cure refers to the level of vulcanization of the stock re its ultimate value when fully vulcanized. As crosslinking proceeds, the modulus of the compounded stock increases, indicating progressively higher states of cure. The optimum state of cure refers to that amount of crosslinking which results in the maximum modulus. All of the properties of the final rubber product imparted thereto by vulcanization do not reach their respective optimum values at the same level of cure, however.

As is well known, there are essentially two kinds of rubbers: thermosetting and thermoplastic. Thermosetting rubbers, once vulcanized, cannot be thermally plasticized, whereas thermoplastic rubbers can be. Throughout the process of the present invention and in the final products, a majority of the rubber crumbs of the internal phase remain thermosetting.

Natural rubber is a polyisoprene, featuring excellent resilience and low hysteresis. "Hysteresis" is a measure of the energy absorbed when the rubber is deformed. In a tensile test, i.e. a stress and strain test diagram, it represents the loop enclosing an extension curve (stretching) and a return curve as the extension is reversed (relaxing). The absorbed energy is equivalent to the reciprocal of the resilience.

Consequently, low hysteresis rubbers are used in applications where low energy absorption is important, such as in the walls, e.g. low carbon white walls of tires, where low energy absorption prevents heat build up as the tire walls flex. Conversely, high hysteresis rubbers are used for tire treads, e.g. carbon black containing tire treads, where the low resilience and energy absorbing properties reduce bouncing and thus help grip the road. Processes now exist for the manufacture of "synthetic natural rubber" by the controlled polymerization of isoprene monomer. The rubber crumbs of the present invention ordinarily contain tire white or other white rubber, and tire black wall and tread rubber, i.e. a mixture of relatively low hysteresis rubber and relatively high hysteresis rubber, as their characteristic ingredients.

The vulcanized tire rubber of the present invention, by total weight, typically consists essentially of: from 8–25% of an organic solvent residue such as acetone; from 5–10% of an inorganic residue such as ash; from 25–45% of an inorganic filler to be specified below; from a trace to 2% moisture; and from 35 to 50% crosslinked rubber hydrocarbon. In the case of tire tread rubber, the filler typically is carbon black. In the case of white side wall tire rubber, the filler typically is clay.

Figure 2:
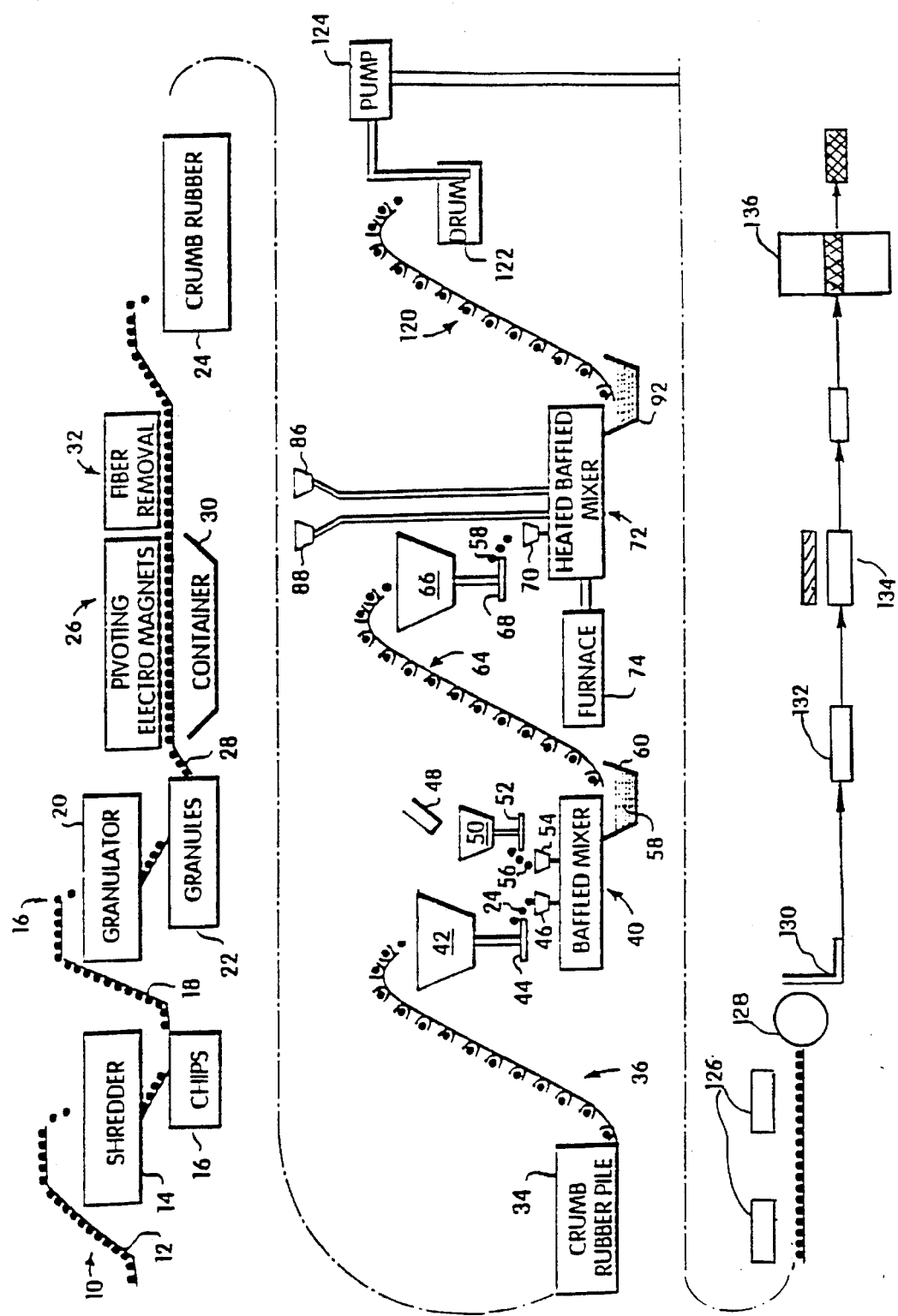
FIG. 2 is a schematic diagram of a process of the invention.

The Detailed Process Steps of FIG. 2

FIG. 2 is a schematic diagram illustrating detailed steps of a preferred process of the present invention. The process begins by feeding a plurality of scrap tire parts 10, via a belt conveyor 12 to a shredder 14, which shreds the tire parts into chips 16 of about 1×2 inches in size. Chips 16 are fed via a second belt conveyor 18 into a granulator 20 where they are comminuted into granules 22 characterized by a mesh size generally in the range of 5 to 50, depending on the requirements of the particular end product intended. If needed, granules 22 can be re-fed to the granulator 20 for a second run to achieve a finer mesh. Alternatively, a pair of granulators 20 can be operated in tandem whenever the production calls for a finer mesh.

The next step involves removal of impurities, such as metal particles and fibers, leaving crumb rubber 24. The removal of steel particles is accomplished by pair of pivotable electro-magnets 26. Each of electromagnets 26 is pivotably mounted via a pivot arm (not shown) and located above a third belt conveyor 28. The pivot arm has two operative positions: a pick-up position, at which the arm locates the magnet over conveyor belt 28, and a drop-off position, at which the arm swings at least 90° away from belt 28 toward a suitable container 30. In the pick-up position, the magnets are energized to attract and separate metal components from rubber granules 22. In the drop-off position, the magnets are de-energized to allow the metal components to fall into container 30, which is located alongside conveyor belt 28. A pair of such pivotable electro-magnets, preferably operated sequentially and mounted in tandem, effectively remove substantially all of the metal components from the rubber crumbs. The removal of the impurities can be optimized by adjusting the speed of belt conveyor 28 and by adjusting the strength of the magnetic flux of the electro-magnets. Adjacent the pivoting electro-magnets 26 is located a fiber removal station 32. Fiber removal station 32 can be any known device, including one that employs screening or blowing to separate relatively extensive fibers from among the relatively comminuted crumb rubber 22. With the impurities removed from crumb rubber 22, a supply of clean crumb rubber 24 is produced.

Crumb rubber 24 ordinarily is bagged for packaging and shipment to a further processing facility according to the invention. The ratio of black to white crumb rubber at 24 is determined, in effect, either by simultaneous or sequential introduction to shredder 14 to provide a supply 34 in accordance with the ratio. Then, crumb rubber 34, via a conveyor 36, and clay particles 56, from a suitable hopper are fed respectively through funnels 42, 50, and via scales 44, 52 through funnels 46, 54 to a baffled mixer 40.

The metered mixing of crumb rubber 24 and clay particles 56 produces a mixture 58 which is collected in a suitable trough 60. This mixture is fed via a conveyor 64 and a funnel 66 and scale 68 to a heated baffled mixer 72. Mixer 72 preferably is heated by a hot air furnace 74 operatively connected thereto. Preferably, and depending upon the end use of the final product, mixer 72 is heated to a temperature from about 100° F. to about 150° F. and, for some applications preferably about 125° F. Also fed to heated baffled mixer are a fluid binder and a curing agent via funnels 86, 88. The resulting intermediate product is heated in heated mixer 72 for about 5 to 15 minutes and at a temperature from about 110° to 175° F. to produce a fluid composite in trough 92.

The fluid composite is continuously removed from trough 92 by a cup conveyor 120 to advance it to a drum 122. From drum 122, the composite is pumped as at 124 in metered charges as at 126. These charges are collandered as at 128 to form a sheet composite 130 that is approximately ¼ inch thick. This sheet is cut into sections 132 that are approximately 38×38 inches in size. Each section is placed on a chrome plated steel mold 134. Then the section and mold are advanced through a press 136 to produce an uncured paver of predetermined configuration.

Figure 3:
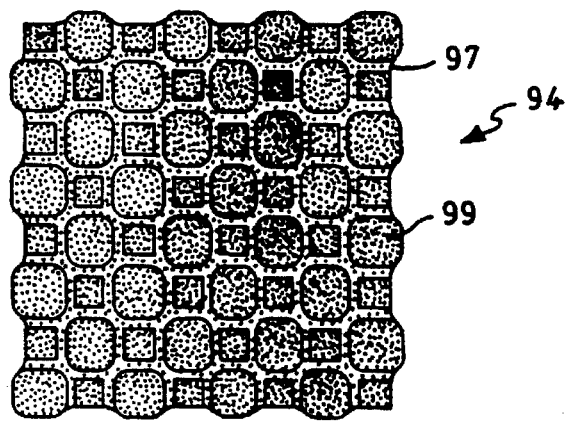
FIGS. 3, 4, 5 and 6 show upper face designs of configurations of various versions of the end product.
Figure 4:
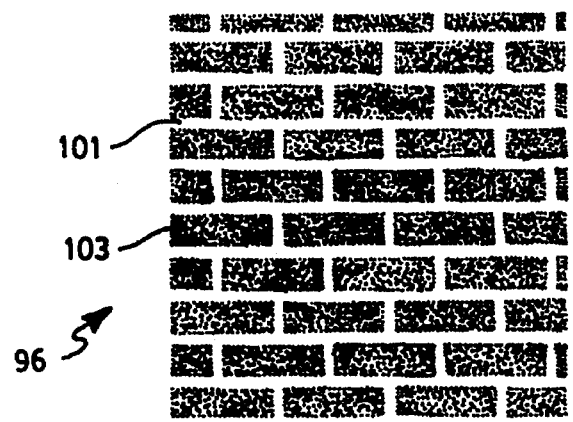
Figure 5:
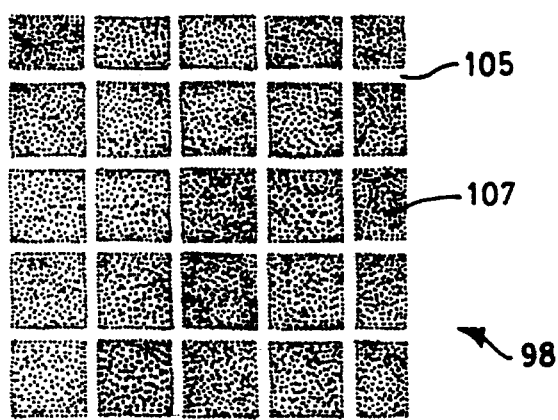
Figure 6:
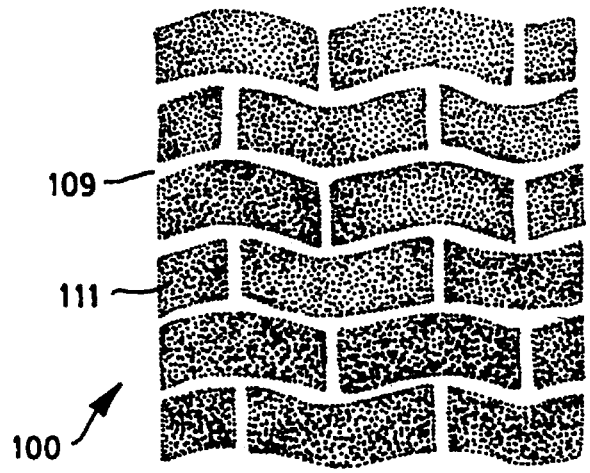

Finally the uncured pavers then are cured by baking within a convection oven at a temperature from about 100° F. to about 150° F., and preferably at about 125° F., for at least about one hour to about three hours. Preferred hardened and cured pavers, in the various forms shown in FIG. 3–6, are ready for packaging and use. FIG. 3 shows grooves 97 and low chroma green lands 99 which define a pattern of hexagons and squares. FIG. 4 includes grooves 101 and reddish lands 103 which define a staggered pattern of rectangular bricks. FIG. 5 includes grooves 105 and grey lands 107, which define a pattern of square tiles. FIG. 6 includes grooves 109 and tan lands 111, which define a pattern of curved brick-like shapes. In each case, the grooves communicate to enable water run off, and the upper faces of the lands are stippled to enhance underfoot friction.

The following non-limiting examples further illustrate the present invention.

EXAMPLE I

A paver of the type shown at 25 in FIG. 1 and FIG. 5 is produced as follows. Approximately 30 parts of rubber crumbs and 30 parts of clay particles are thoroughly mixed to form a closely packed powder. Under the microscope, the crumb rubber particles have shredded surfaces with extending fibrils and deep asperities. Under the microscope, the clay particles have typical crystalline facets at irregular angles. By weight of the crumb rubber particles, the white particles are about 10% and the remainder are black. The composition and mesh of the crumb rubber particles were approximately as follows:

| Components | Parts by Total Weight |
|---|---|
| Rubber Crumbs | 25 |
| Clay Filler | 30 |
| EDPM Binder | 30 |
| Process Oil | 5 |
| Curing Agents | 20 |

The average mesh size of the rubber crumbs is 16.
The average mesh size of the clay particles is 350.

TABLE 1

| Description: |
|---|
| Baker Rubber, Inc., GRANULITE ® TR Series black ground rubber, produced from truck and passenger tread rubber, free of foreign material, fabric, and steel, in particle sizes per the sieve analysis below. |

| Analysis: | Minimum (% Wt.) | Maximum (% Wt.) | Test Method |
|---|---|---|---|
| Acetone Extract | 10.0% | 22.0% | BTM-4-07 |
| Ash Content |  | 7.0% | BTM-4-05 |
| Carbon Black Content | 29.0% | 39.0% | BTM-4-10 |
| Moisture Content |  | 1.0% | BTM-4-04 |
| Rubber Hydrocarbon | 42.0% |  |  |
| Bulk Density | 100 GM/210 cc |  | BTM-4-02 |
| Sieve Analysis - % Retained (Wt.) |  |  | BTM-5-01 |

| USA Sieve No. | TR-10 | TR-16 | TR-20 | TR-30 | TR-35 | TR-40 |
|---|---|---|---|---|---|---|
| 8 (.0937) | 0 max | — | — | — | — | — |
| 10 (.0787) | 3 max | 0 max | — | — | — | — |
| 16 (.0469) | — | 3 max | 0 max | — | — | — |
| 20 (.0331) | 25 min | — | 5 max | 0 max | 0 max | 0 max |
| 30 (.0234) | — | 15–45 min | 25 min | 5 max | 0.1 max | 0.1 max |
| 35 (.0197) | — | — | — | 5 max | — | |
| 40 (.0165) | — | — | 25 min | — | 10 max | |
| 50 (.0117) | — | — | — | 25 min | 25 min | |

TABLE 2

| Description: |
|---|
| White ground rubber, produced from automotive white wall tires, free of foreign material, fabric, and steel. |

| Analysis: | Minimum (% Wt.) | Maximum (% Wt.) | Test Method |
|---|---|---|---|
| Acetone Extract | 10.0% | 22.0% | BTM-4-07 |
| Ash Content |  | 7.0% | BTM-4-05 |
| Clay Content | 29.0% | 39.0% | BTM-4-10 |
| Moisture Content |  | 1.0% | BTM-4-04 |
| Rubber Hydrocarbon | 42.0% |  |  |
| Bulk Density | 100 GM/210 cc |  | BTM-4-02 |

TABLE 3

| One specification for the clay particles is as follows: | |
|---|---|
| Parameter | Specification |

TABLE 3-continued

| | |
|---|---|
| Moisture | 1.0 max @ 120° C. for 2 hrs |
| Specific Gravity | 2.58 |
| Particle Size | 0.8 μm average |
| % Finer Than 2 μm | 81–85% wt |
| Bulk Density | 25 (loose) lbs/ft³ |
| | 40 (firm) lbs/ft³ |
| Brightness | 79–81% Reflectance |
| Sieve Tests: | |
| On 325 Mesh | 0.7 max |
| Chemical Properties: | |
| Chemical | Amount by weight |
| $Al_2O_3$ | 39.5 ± 1% |
| $SiO_2$ | 44.5 ± 1% |
| $TiO_2$ | 1.5 ± 0.3% |
| $Fe_2O_3$ | 1.0 ± 0.3% |
| CaO | 0.25 ± 0.25% |
| Cu | None |
| Mn | None |

TABLE 4

A preferred EPDM rubber binder is sold by Uniroyal, Inc. under the trade designation ROYALENE 535. The raw polymer has the following properties.

| Properties | Method (Uniroyal) | Min. | Max. | Typical |
|---|---|---|---|---|
| Mooney Viscosity, ML 1 + 4 @ 100° | R-1 | 45 | 60 | — |
| E/P Weight Ratio | R-2 | — | — | 57/43 |
| ENB, Weight % | R-6 | — | — | 9.5 |
| Molecular Weight Distribution | R-9 | — | — | Medium |
| Volatile Matter, Weigh % | R-3 | — | 1.0 | — |
| Ash, Weight % | R-4 | — | 0.15 | — |
| Stabilizer | — | — | — | Non-staining |
| Specific Gravity | ASTM D-792 | — | — | 0.86 |
| Color | R-7 | — | — | Light Amber |
| Physical Form, lbs/bale | — | — | — | 75 (34 Kg) |
| Packaging, lbs/skid (net) | — | — | — | 1800 (818 Kg) |

TABLE 5

This uncured polymer is added to the already vulcanized rubber crumbs and the clay particles, together with the following additives in the following proportions.

| Recipe: | Parts By Total Weight of Recipe |
|---|---|
| ROYALENE 535 | 100.00 |
| Naphthol Oil | 50.00 |
| Zinc Oxide | 5.00 |
| Dicumyl Peroxide (40% active) | 8.00 |
| Trimethylol Propane Trimethacrylate | 2.00 |

TABLE 6

Alternatively the uncured polymer is added to the already vulcanized rubber crumbs and clay particles, together with the following agents in the following proportions.

| Recipe: | Parts (wt.) |
|---|---|
| ROYALENE 535 | 100.00 |
| Naphthol Oil | 50.00 |
| Zinc Oxide | 5.00 |
| Stearic Acid | 1.00 |
| Mercaptobenzothiazol | .50 |
| Tetramethylene Thiuran | 1.00 |
| Sulfur | 1.50 |

The composite mixture is heated in the mold at 340° F. for 12 minutes. The resulting product, which is well adapted for use as a paver, is generally rectangular in shape and about ¼th inch thick. The resulting product has a specific gravity of 1.32 and a hardness of 50 Shore A. Several of these pavers when bonded to a driveway by a bituminous cement, show excellent wear, chemical, and weather resistance. The driveway paved as above first is roughened and swept free of dust and dirt. The pavers then are cemented in place by a cement, sold under the commercial designation "Crafco Standard Pavement Marker Adhesive" by Crafco, Chandler, Ariz. Crafco Standard Pavement Marker Adhesive is a hot-applied bituminous material which, when properly used and applied, bonds overlays to both asphalt and concrete pavement surfaces. Standard Pavement Marker Adhesive is supplied as an easy to use single component material which is easily melted and poured or pumped onto pavement surfaces. Since it is a hot melt composition, Standard Marker Adhesive sets up on cooling and is ready for traffic in less than 5 minutes. After being melted, using gentle heating supplied by a hot plate or flame and stirring while heating to 425 ° F., the adhesive has the following properties:

TABLE 7

| Test | Spec. Limits (90% min.) |
|---|---|
| Flash Point, C.O.C., F(ASTM D92) | 550 F. min. |
| Brookfield Viscosity, #4 Probe 400 F. cp(ASTM D3236) | 3000–6000 |
| Softening Point, F (ASTM D36) | 200 F. min. |
| Penetration @ 77 F. 100 g. 5 sec. 1/10 mm (ASTM D5) | 10–20 |
| Insoluble Content as determined by solubility (ASTM D2042) | 67–75% |
| Fineness of Insolubilities on 200 mesh by wet screening | |
| Specific Gravity (ASTM D70) | 1.4–1.9 |
| Flow, 160 F., mm (ASTM D3407) | 5 max. |

EXAMPLES 2, 3 AND 4

In the case of FIG. 5, there is no pigment and the grey color is derived by the formulation of black rubber and white rubber crumbs. In the case of FIGS. 3, 4 and 6, the color is derived from pigments, which constitute about 10% of the composition by total weight or 50% by weight of the miscellaneous contents, are distributed throughout the paver or tile so as to resist fading.

Operation

In operation, the process of the present invention comprises the following steps. Shredding a supply of rubber tires to produce a supply of white rubber pieces and black rubber pieces. Grinding the rubber pieces to produce a preliminary supply of vulcanized rubber crumbs and metal and fiber impurities. Magnetically removing the metal and aerodynamically removing the fiber from the supply to produce an intermediate supply of vulcanized rubber crumbs. Mixing the intermediate supply of vulcanized rubber crumbs with a supply of clay particles to produce a dry powder. Mixing the dry powder and a binder having as its essential ingredient ethylene propylene diene EPDM rubber. Thoroughly wetting the surfaces of the rubber crumbs and the crystalline particles and forming a viscous composite having an internal phase of closely packed rubber crumbs and mica granules and an external phase of EPDM rubber. Curing the viscous composite to form a solid composite having an internal phase including final rubber crumbs and final clay particles, which substantially retain their original configurations. This composition is utilized in a molded product having communicating grooves that permit water to run off and stippled lands that increase underfoot friction. These pavers or tiles are cemented to driveways, walkways or other outdoor or indoor surfaces.

What is claimed is:

1. An overlay for outdoor surfaces, said overlay consisting essentially of:
   (a) recycled crumbs composed of black tire rubber and white tire rubber, said rubber crumbs having fibrillar surfaces with asperities;
   wherein said black tire rubber, by weight thereof, consists essentially of from 8 to 25% of organic solvent residue, from 5 to 10% of an inorganic residue, from 25 to 45% of carbon black, from a trace to 2% moisture, and from 35 to 50% of vulcanized hydrocarbon rubber;
   wherein said white tire rubber, by weight thereof, consists essentially of from 8 to 25% of organic solvent residue, from 5 to 10% of an inorganic residue, from 25 to 45% of a first clay, from a trace to 2% moisture, and from 35 to 50% of vulcanized hydrocarbon rubber;
   wherein said rubber crumbs have a mesh size averaging approximately 16;
   (b) a second clay in particle form composed of aluminosilicate;
   wherein said second clay particles have a mesh size averaging approximately 350;
   (c) a binder composed primarily of ethylene-proplylene-diene rubber and a vulcanizing agent selected from the group consisting of sulfur and peroxide;
   wherein said rubber crumbs and said second clay particles are present in approximately equal amounts by weight, and, in parts by total weight of said overlay, the combination of said rubber crumbs and said second clay particles ranges from 45 to 65, and said binder ranges from 25 to 35;
   wherein said binder thoroughly contacts the surfaces of said rubber crumbs and said second clay particles;
   wherein said rubber crumbs and said second clay particles form an internal phase that is closely packed;
   wherein said binder forms an external phase;
   wherein said overlay has a hardness of at least 40 Shore A;
   wherein said overlay is approximately ¼ inch in thickness; and
   wherein said overlay has at its upper surface communicating channels and stippled lands.

* * * * *